United States Patent [19]
Steele

[11] Patent Number: 5,934,055
[45] Date of Patent: Aug. 10, 1999

[54] LAWN AERATION ACCESSORY

[76] Inventor: P. Alan Steele, 3 Winthrop Dr., Sharpsburg, Ga. 30277

[21] Appl. No.: 08/917,247

[22] Filed: Aug. 25, 1997

[51] Int. Cl.$^6$ .................................................. A01D 43/12
[52] U.S. Cl. ....................... 56/16.7; 56/DIG. 9; 152/222; 152/223; 172/21
[58] Field of Search ........................ 56/16.7, 1, DIG. 9; 152/213 A, 213 R, 223, 239, 216, 221, 222; 172/21, 20

[56] References Cited

U.S. PATENT DOCUMENTS

| | | | |
|---|---|---|---|
| 2,679,882 | 6/1954 | Rich | 152/222 |
| 4,508,150 | 4/1985 | Granryd | 152/213 A X |
| 4,662,417 | 5/1987 | Lee | 152/221 X |
| 4,749,015 | 6/1988 | Miyagawa | 152/222 X |
| 5,662,172 | 9/1997 | Brown | 56/16.7 X |

FOREIGN PATENT DOCUMENTS 303018  12/1928  United Kingdom ................... 152/222

*Primary Examiner*—Terry Lee Melius
*Attorney, Agent, or Firm*—William B. Noll

[57] ABSTRACT

Invention relates to a lawn aeration device for attachment to the wheel of a riding mower, for example. The device, where a plurality are spaced about each driven wheel, comprises an arcuate-shaped metal plate, contoured to lie against the riding surface of the wheel's tire, where the metal plate includes plural aerating spikes extending in a generally outwardly radial direction. Adjustment means are also provided along the respective sides of the wheel to connect and apply tension to the plural devices.

6 Claims, 1 Drawing Sheet

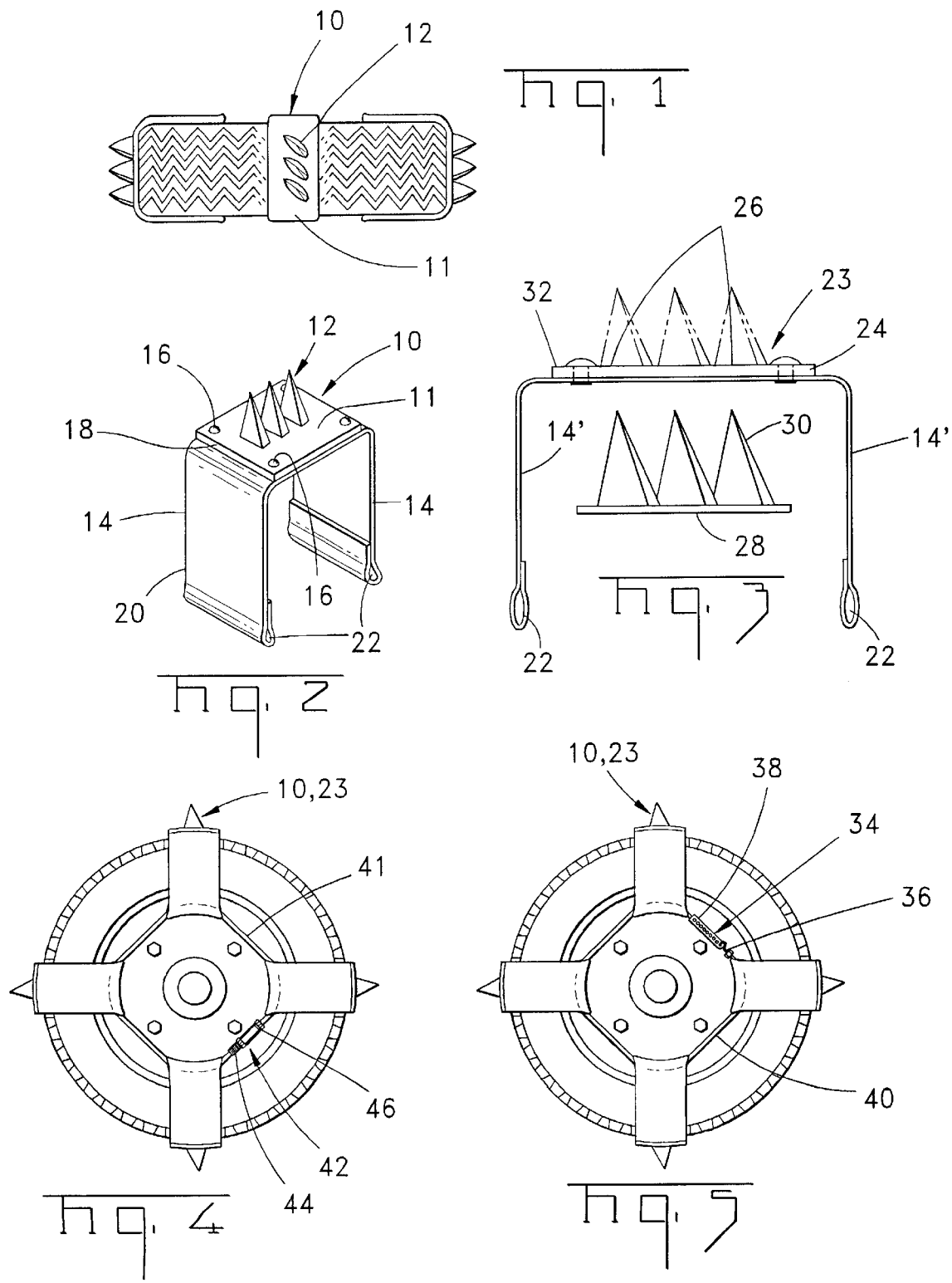

LAWN AERATION ACCESSORY

BACKGROUND OF THE INVENTION

The present invention relates to a device for aerating lawns, for attaching to the wheels of a riding mower, where the aeration may be accomplished in concert with the mowing of the lawn. Typically, aeration devices used by the average homeowner are walk behind, powered machines that include a rotating spiked member for piercing the sod to allow nutrients to reach well below the surface of the lawn. Such machines, usually rented from a local rental outlet, are heavy and often cumbersome to operate. For the limited times such a machine is required, economics dictate that a purchase by the homeowner is not practical.

The present invention represents an economical approach to the average homeowner, and allows him to mow and aerate at the same time. A similar, but nevertheless a different approach, is found in the use of tire mounted devices for improved traction of automobiles in snow and ice. The prior art is replete with references for such traction enhancing devices, yet are silent on the use of aeration devices for a riding mower, for example. U.S. Pat. No. 4,643,251, relates to an elaborate device for providing improved traction for an automobile that includes a plurality of circularly spaced, flexible traction members overhanging the tread of a pair of wheels and control means operable from the driving position of the vehicle to selectively couple or uncouple the attachment relative to the wheels.

U.S. Pat. No. 4,357,975, teaches an anti-skid tire chain that overrides the treads of an automotive tire. The device is a series of traction rings extending medially between a pair of side chains.

U.S. Pat. No. 4,274,463, relates to traction enhancing apparatus for attachment to vehiclar tires having both circumferential and cross chain members engaging the tread of the tire and further including one or two semi-rigid U-shaped bridle members for gripping the tire sidewalls during installation.

U.S. Pat. No. 3,955,610, teaches a further traction enhancing device that comprises at least one chain having first and second ends of a length slightly greater than the circumference of the tire, a latch for securing the first end, and a plurality of generally U-shaped members affixed to the chain at spaced-apart intervals. The members further include a tire tread engaging base portion and a pair of opposed tire sidewall engaging portions, where the chain serves to provide improved traction on ice, the base portion serves to provide improved traction on snow, and the tire sidewall engaging portions serve to maintain the chain on the tread.

While these automotive devices appear to serve the need of providing enhanced traction in ice and snow, for example, they do not meet the needs of the homeowner in providing a convenient manner of aerating his lawn, particularly at the time of mowing thereof. The manner by which this may be achieved will become apparent to those skilled in the art, particularly when read in conjunction with the accompanying drawings.

SUMMARY OF THE INVENTION

The invention relates to a lawn aeration necessary for removable attachment to an operator driven, grass mowing type vehicle, also commonly called a riding mower. Typically such vehicles include a pair of driven wheels, each mounting a tire having a generally flat annular tread face. The aeration mechanism comprises a plurality of aeration devices uniformly spaced about the periphery of each driven wheel. Each device includes an arcuate-shaped metal plate, contoured to lie against the annular tire face, with plural metal spikes extending in a generally outwardly radial direction therefrom. Adjustable means are provided on the respective sides of each wheel connecting each aeration device of a respective wheel, and for applying tension thereto.

An object of this invention is to provide an easily mounted aeration device for a riding mower, or similar vehicle, where the aeration operation may be accomplished at the same time as the mowing of the lawn.

A further object of the invention is to provide a readily removable device by the mower operator.

These and other objects will be most apparent to the person skilled in the art from a reading of the specification to follow.

BRIEF DESCRIPTION OF DRAWINGS

FIG. 1 is a top plan view of the lawn aeration accessory according to this invention, illustrating a plurality of the accessories mounted on a wheel or a riding mower, for example.

FIG. 2 is a perspective view of a first embodiment according to this invention.

FIG. 3 is an exploded side view of a second embodiment thereof, where the phantom lines indicate the assembled position for the respective components.

FIG. 4 is a front view of a wheel mounting four of the accessories of this invention.

FIG. 5 is a back view of a wheel mounting four of the accessories.

DETAILED DESCRIPTION OF PREFERRED EMBODIMENT

The present invention is directed to a lawn aeration accessory that may be removably attached to a riding mower, for example, where mowing and aeration may be accomplished at the same time. The aeration accessory is illustrated in the several Figures, where like reference numerals represent the same components or features throughout the various views.

Briefly, and by way of background, a typical riding mower, or lawn tractor, as known in the art, is a small powered vehicle having a sit-down operator, where the rear wheels are generally power driven, such as by a sprocket and chain, by an engine that also provides cutting power to the rotary, grass cutting blades. The wheels include inflatable tires which are characterized by a generally flat annular tread face or surface, an outside face and an inside face, where the drive axle extends inwardly from the inside face.

The aeration device 10, for removable mounting to a drive wheel of a riding mower, for example, is best illustrated in FIGS. 1 through 3. In a first embodiment (FIGS. 1 and 2), the device 10 preferably comprises an arcuate-shaped, generally rectangular plate 11 having a row of aeration spikes 12 projecting essentially perpendicular to the surface of the plate. The plate 11 is preferably mounted to a flexible belt 14, such as fasteners 16, where the belt 14 beyond each side edge 18 of the plate 11, terminates in distal ends 20 having laterally disposed loops 22 therein. For reasons to be explained hereafter, one belt end is preferably longer than the other belt end. In any case, the flexible belt 14 may be fabricated from a material such as a rubberized or coated canvas.

An alternate embodiment for the plate is illustrated in FIG. 3, where the aeration device 23 comprises a first metal plate 24, secured to a flexible belt 14', at an intermediate position thereon. The first metal plate 24 includes a series of through holes 26, aligned with complementary holes in the belt 14'. Cooperating with the respective holes is a second, replaceable plate 28 containing a series of spikes 30, where the second plate and associated spikes may be fabricated of metal or plastic. In either case, the spikes 30 are arranged to project through the aligned holes above the outer face 32 of first metal plate 24. In this embodiment the operator has the flexibility to use different spikes depending on the type of aeration desired. For instance, the second plate may contain a series of angled teeth or spikes to alter the sod piercing action, such as digging rather than punching, or even change the depth of piercing.

To secure the devices 11, 23 about the periphery of the wheel, where typically four are used, the device, with spikes extending radially outwardly, is placed over the tire face or tread with the looped ends of the belt 14, 14' extending along a respective side of the wheel, where the shorter end of the belt, see FIG. 3, for example, is on the inside of the wheel. Since the inside face of the wheel is less accessible, a preferred system for applying an initial tension force to the devices 11, 23 consists of a continuous member, such as a nylon cord, passing through the loops 22, then secured by a hook and strap arrangement 34, se FIG. 5. This type of securing means, for initial tensioning thereof, can be adjusted by "feel", by simply pulling on the hook 36 and inserting same into an appropriate hole 38 along the cord 40, or strap.

Once the inside adjustment arrangement 34 is secured, a final adjustment may be effected on the accessible or outside face of the wheel. The longer ends of the belt 14, 14' lie along the outside face of the wheel. For such final adjustment, a comparable continuous member or cord 41 is used. As best seen in FIG. 4, an incrementally adjustable mechanism 42 may be used. This may include a first, fixed, threadable end 44, attached to one end of the cord 41, and an adjustable swivel end 46, attached to the opposite end of the cord 41, having complementary threads to engage the end 44. By rotating the swivel end 46, the cord 41 may be tightened, as desired, to fix the respective devices 11, 23 about the annular tread face of the wheel's tire.

I claim:

1. In combination with an operator driven, lawn mowing type vehicle, where said vehicle includes a pair of driven wheels having tires thereon, said tires exhibiting an essentially flat annular tread surface, an aeration mechanism for removably mounting to said driven wheels, said mechanism comprising:

a.) a plurality of aeration devices uniformly spaced about the periphery of each said driven wheel, where each said device includes an arcuate-shaped metal plate contoured to lie against said annular surface, cooperating plural metal spikes extending in a generally outwardly radial direction therefrom, said metal plate having an array of holes therethrough, and said cooperating plural metal spikes comprises a second metal plate member having an array of spikes extending therefrom, where said array of spikes are each arranged to extend through a complementary said hole, and b.) adjustable means on the respective sides of said wheels connecting each said device to a respective said wheel, and for applying tension thereto.

2. The combination according to claim 1, wherein said arcuate-shaped metal plate includes a pair of flexible extensions therefrom, said extensions lying against a respective side of said wheel and engagable by said adjustable means.

3. The combination according to claim 2, wherein said extensions are formed of a canvas like material, and each said extension includes a distal end having a loop therein for receiving said adjustable means.

4. The combination according to claim 3, wherein said adjustable means includes a continuous member passing through said loops along a respective side of said wheel, where said continuous member includes means for making said continuous member smaller to secure last said metal plate against said essentially flat annular surface.

5. The combination according to claim 4, wherein said continuous member is a flexible and stretchable cord.

6. The combination according to claim 3, wherein a respective pair of extensions is a single member, and that said metal plate is joined to said single member at an intermediate location between said distal ends.

* * * * *